US008704802B2

(12) United States Patent
Chien et al.

(10) Patent No.: US 8,704,802 B2
(45) Date of Patent: Apr. 22, 2014

(54) TOUCH DISPLAY DEVICE

(75) Inventors: Chih-Wei Chien, Taoyuan County (TW); Shau-Yu Tsai, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 447 days.

(21) Appl. No.: 13/005,541

(22) Filed: Jan. 13, 2011

(65) Prior Publication Data

US 2012/0086673 A1 Apr. 12, 2012

(30) Foreign Application Priority Data

Oct. 12, 2010 (TW) ............................. 99134792 A

(51) Int. Cl.
*G09G 5/00* (2006.01)
(52) U.S. Cl.
USPC ........ 345/175; 345/173; 345/174; 178/18.01; 178/18.06
(58) Field of Classification Search
USPC .................... 345/173–178; 178/18.01–18.09, 178/19.01–19.06; 362/616, 621, 622
See application file for complete search history.

(56) References Cited

U.S. PATENT DOCUMENTS

| 4,507,557 A * | 3/1985 | Tsikos ........................ 250/341.7 |
| 4,710,760 A | 12/1987 | Kasday | |
| 6,762,747 B2 | 7/2004 | Fujioka et al. | |
| 7,303,326 B2 * | 12/2007 | Fu et al. ......................... 362/630 |
| 7,538,894 B2 | 5/2009 | Kobayashi | |
| 8,197,112 B2 * | 6/2012 | Park et al. ..................... 362/615 |
| 2009/0128499 A1 | 5/2009 | Izadi et al. | |
| 2009/0128508 A1 * | 5/2009 | Sohn et al. .................... 345/173 |
| 2009/0219256 A1 * | 9/2009 | Newton ........................ 345/173 |
| 2009/0309841 A1 * | 12/2009 | Wilson et al. ................. 345/173 |

FOREIGN PATENT DOCUMENTS

JP 2010145865 7/2010

OTHER PUBLICATIONS

"Office Action of Taiwan Counterpart Application", issued on Jun. 28, 2013, p. 1-p. 7, in which the listed references were cited.

* cited by examiner

*Primary Examiner* — Jennifer Nguyen
(74) *Attorney, Agent, or Firm* — Jianq Chyun IP Office

(57) ABSTRACT

A touch display device includes a device housing, a display module, and an optical touch module. The display module is located within the device housing and has a display region and a peripheral region surrounding the display region. The optical touch module is configured on the display module. Besides, the optical touch module includes a light guide element, a light source, and a photo sensor. The light guide element has a top surface and includes a light guide portion and an outer frame portion. The light guide portion is located on the display region. The outer frame portion extends from an edge of the light guide portion and is connected to the device housing. The light source supplies light to the light guide portion. The photo sensor receives the light from the light guide portion. The outer frame portion covers the light source and the photo sensor.

16 Claims, 6 Drawing Sheets

TOUCH DISPLAY DEVICE

CROSS-REFERENCE TO RELATED APPLICATION

This application claims the priority benefit of Taiwan application serial no. 99134792, filed on Oct. 12, 2010. The entirety of the above-mentioned patent application is hereby incorporated by reference herein and made a part of this specification.

BACKGROUND OF THE INVENTION

1. Field of the Invention

The invention relates to a touch display device. More particularly, the invention relates to an optical touch display device.

2. Description of Related Art

The increasing progress of display technologies brings about great conveniences to people's daily lives, and the demands for light and compact display devices contribute to the development of flat panel displays (FPDs) as mainstream displays. Among various FPDs, liquid crystal displays (LCDs) characterized by great space utilization, low power consumption, non-radiation, and low electromagnetic interference are prevailing.

With advancement of information technology, wireless mobile communication, and information appliances, input devices of various information products including conventional key boards or mice have been replaced by touch panels in order to comply with requirements for portability, compactness, and user-friendly interfaces, and the touch panels are integrated with displays to form touch display devices. At present, the touch panels can be generally categorized into resistive touch panels, capacitive touch panels, optical touch panels, acoustic wave touch panels, electromagnetic touch panels, and so on. Since the touch-sensing mechanisms of the optical touch panels are suitable for the large-sized display panels, the display panels with large size often achieve the touch-sensing function by applying the optical touch-sensing mechanisms.

FIG. 1A is a schematic cross-sectional view illustrating a conventional LCD. With reference to FIG. 1, the LCD 100 includes a device housing 110 and a liquid crystal display module (LCM) 120, and the LCM 120 is configured within the device housing 110. In general, the LCM 120 is formed by assembling a front bezel 121, an LCD panel 123, a frame 125, an optical thin film 127, a light guide plate 129, a backlight source 131, and a back bezel 133. However, the display surface of the LCM 120 and the surface of the device housing 110 are not at the same horizontal level, which poses a negative impact on visual effects.

FIG. 1B is a schematic cross-sectional view illustrating a conventional touch display device. With reference to FIG. 1B, in the touch display device 101, an optical touch module 140 is configured between the device housing 110 and the LCM 120. The optical touch module 140 includes a light source 141, a photo sensor 143, and a reflector 145. However, after the optical touch module 140 is additionally formed in the touch display device 101, the level difference between the display surface 120D of the LCM 120 and the surface 110S of the device housing 110 becomes more significant, which further leads to unpleasant visual effects.

FIG. 1C is a schematic view illustrating a back bezel in a bent state or not in a bent state in a conventional optical touch module. With reference to FIG. 1C, the optical touch module 150 includes a light source 151, a photo sensor 153, and a back bezel 155. When the back bezel 155 is not bent yet, the photo sensor 153 can receive light from the light source 151, and the light receiving range of the photo sensor 150 is between the straight line L1 and the straight line L2. After the back bezel 155 is bent, the light source 151 is located beyond the light receiving range of the photo sensor 153, such that the photo sensor 153 is unlikely to receive the light from the light source 151, and that erroneous touch points are detected.

SUMMARY OF THE INVENTION

The invention is directed to a touch display device in which an optical touch module and a cover lid are integrated, so as to improve visual effects of the touch display device and provide optical touch-sensing functions.

The invention provides a touch display device that includes a device housing, a display module, and an optical touch module. The display module is located within the device housing and has a display region and a peripheral region surrounding the display region. The optical touch module is configured on the display module. The optical touch module includes a light guide element, a light source, and a photo sensor. The light guide element has a top surface and includes a light guide portion located on the display region and an outer frame portion extending from an edge of the light guide portion. The outer frame portion is connected to the device housing. The light source supplies light to the light guide portion and is covered by the outer frame portion. The photo sensor receives the light from the light guide portion and is covered by the outer frame portion.

According to an embodiment of the invention, the display module includes an LCM.

According to an embodiment of the invention, the LCM includes a backlight source, a frame, an LCD panel, a back bezel, and a front bezel. The frame accommodates the backlight source. The LCD panel is configured on the frame and located above the backlight source. The back bezel holds the frame and the backlight source. The front bezel is assembled to the back bezel, the frame, and the LCD panel.

According to an embodiment of the invention, the light source and the photo sensor are configured on the front bezel.

According to an embodiment of the invention, the front bezel has a groove that accommodates the light source and the photo sensor.

According to an embodiment of the invention, the LCM includes a backlight source, a frame, and an LCD panel. The LCD panel is configured on the frame and located above the backlight source. The frame holds and accommodates the backlight source and the LCD panel.

According to an embodiment of the invention, the light source and the photo sensor are configured on the frame.

According to an embodiment of the invention, the frame has a groove that accommodates the light source and the photo sensor.

According to an embodiment of the invention, the outer frame portion extends beyond the peripheral region and extends above the device housing to connect the device housing.

According to an embodiment of the invention, the light guide portion and the outer frame portion are integrally formed.

According to an embodiment of the invention, a thickness of the light guide portion is greater than a thickness of the outer frame portion.

According to an embodiment of the invention, a sidewall of the light guide portion includes a lateral light emitting surface, a lateral light incident surface, and a plurality of reflective surfaces. The light source is configured next to the lateral light incident surface. The photo sensor is configured next to the lateral light emitting surface. The optical touch module further includes a plurality of reflectors configured on the reflective surfaces, so as to reflect the light from the light source back to the lateral light emitting surface.

According to an embodiment of the invention, the lateral light emitting surface is a plane or a curved surface.

According to an embodiment of the invention, a sidewall of the light guide portion includes a lateral light emitting surface and at least one lateral light incident surface. The photo sensor is configured next to the lateral light emitting surface. The light source is configured next to the at least one lateral light incident surface and includes a light guide pillar and a light emitting element. Light supplied by the light emitting element is transmitted from the at least one lateral light incident surface to the light guide portion through the light guide pillar.

According to an embodiment of the invention, the light source, the photo sensor, and the outer frame portion are configured on the peripheral, region.

According to an embodiment of the invention, the top surface is a flat surface.

According to an embodiment of the invention, the light guide portion covers the display region and a portion of the peripheral region.

According to an embodiment of the invention, the device housing has a groove accommodating the light source and the photo sensor.

Based on the above, the light guide element in the touch display device of the invention serves as the cover lid, and the light guide portion of the light guide element transmits the light supplied by the light source of the optical touch module. Thereby, visual effects of the touch display device can be improved, and erroneous operation of the optical touch module can be precluded.

In order to make the aforementioned and other features and advantages of the invention more comprehensible, several embodiments accompanied with figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

Figure 1A:
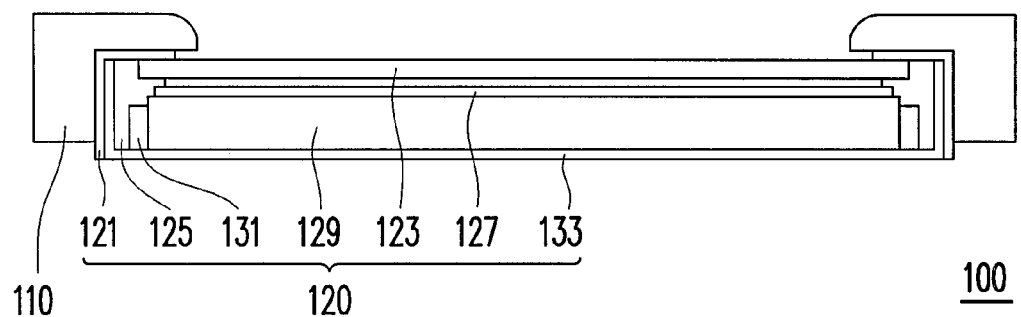
FIG. 1A is a schematic cross-sectional view illustrating a conventional LCD.
Figure 1B:
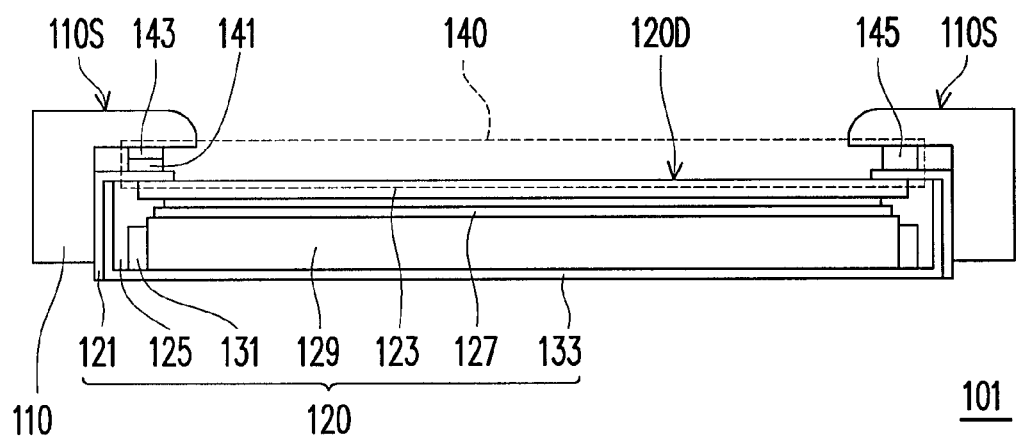
FIG. 1B is a schematic cross-sectional view illustrating a conventional touch display device.
Figure 1C:
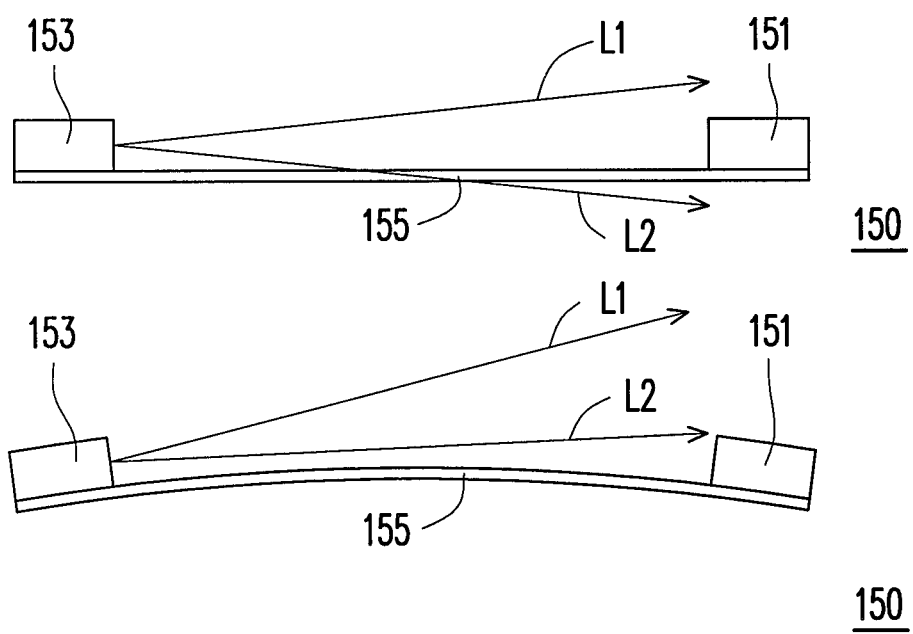
FIG. 1C is a schematic view illustrating a back bezel in a bent state or not in a conventional optical touch module.
Figure 2:
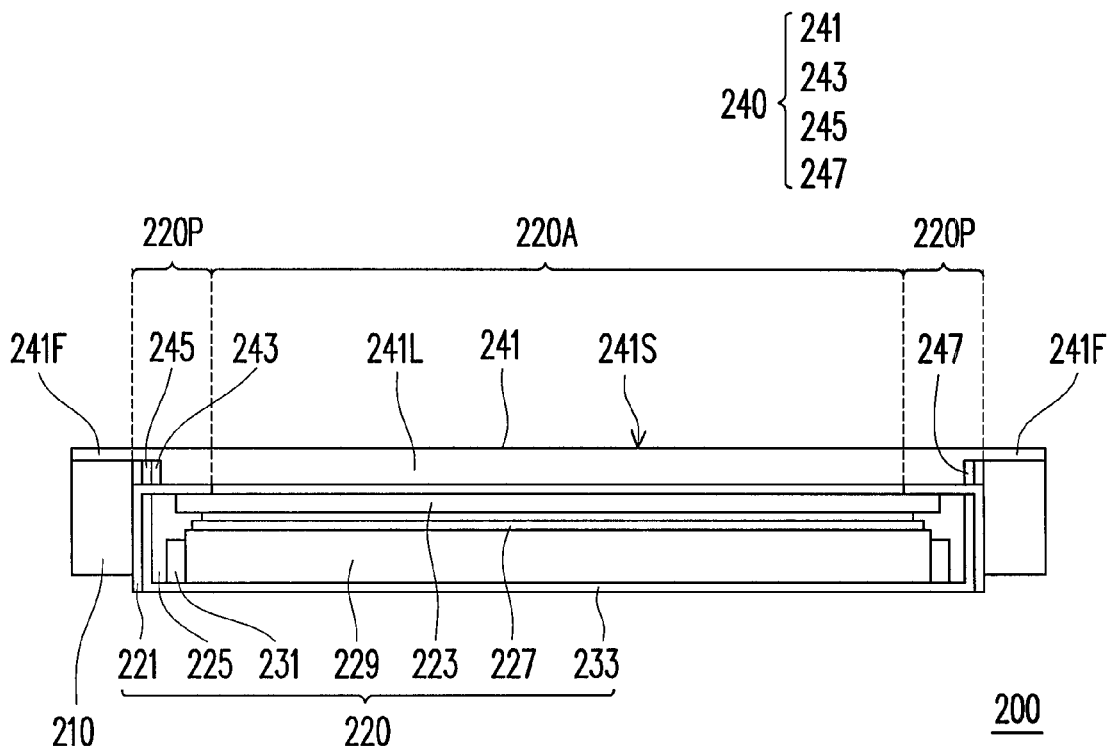
FIG. 2 is a schematic cross-sectional view illustrating a touch display device according to a first embodiment of the invention.

FIG. 2 is a schematic cross-sectional view illustrating a touch display device according to a first embodiment of the invention. With reference to FIG. 2, in this embodiment, the touch display device 200 includes a device housing 210, a display module, and an optical touch module 240. Here, the display module is an LCM 220, for instance. The LCM 220 is configured within the device housing 210, and the LCM 220 has a display region 220A and a peripheral region 220P that surrounds the display region 220A. The optical touch module 240 is configured on the LCM 220.

The optical touch module 240 includes a light guide element 241, a light source 243, a photo sensor 245, and a reflector 247. The light guide element 241 has a top surface 241S. Here, the top surface 241S can be a flat surface. Besides, the light guide element 241 includes a light guide portion 241L located on the display region 220A and an outer frame portion 241F extending from an edge of the light guide portion 241L. The light guide portion 241L and the outer frame portion 241F can be integrally formed, and a thickness of the light guide portion 241L is greater than a thickness of the outer frame portion 241F. The outer frame portion 241F, the light source 243, the photo sensor 245, and the reflector 247 are configured on the peripheral region 220P.

The light guide portion 241L covers the display region 220A and a portion of the peripheral region 220P. The outer frame portion 241F extends beyond the peripheral region 220P and extends above the device housing 210 to connect the device housing 210. Here, the outer frame portion 241F also covers the light source 243 and the photo sensor 245. The light source 243 supplies light to the light guide portion 241L. The photo sensor 245 receives the light from the light guide portion 241L. The visual effects of the touch display device 200 can be improved by means of the light guide element 241 of the optical touch module 240. Besides, the light of the light source 243 is transmitted through the light guide portion 241L, so as to prevent the touch-sensing function from being affected when the touch display device 200 is bent.

To be more specific, the LCM 220 includes a front bezel 221, an LCD panel 223, a frame 225, an optical thin film 227, a light guide plate 229, a backlight source 231, and a back bezel 233. The frame 225 accommodates the backlight source 231. The LCD panel 223 is configured on the frame 225 and located above the backlight source 231. The back bezel 233 holds the frame 225, the optical thin film 227, the light guide plate 229, and the backlight source 231. The optical thin film 227 is configured on the light guide plate 229. The backlight source 231 supplies the light to the light guide plate 229, so as to provide the LCD panel 223 with the required (planar) light source. The front bezel 221 is assembled to the back bezel 233, the frame 225, and the LCD panel 223.

In view of the above, the display region 220A and the peripheral region 220P of the LCM 220 can be defined by the front bezel 221. Namely, the region covered by the front bezel 221 refers to the peripheral region 220P, while the region not covered by the front bezel 221 refers to the display region 220A. The light source 243, the photo sensor 245, and the reflectors 247 of the optical touch module 240 are configured on the front bezel 221 of the LCM 220. In general, the LCD panel 223 includes a color filter substrate, an active device array substrate, and a liquid crystal layer, and the optical thin film 227 includes a diffusion film, a light enhancement film, and so on. However, the invention is not limited thereto.

Figure 3:
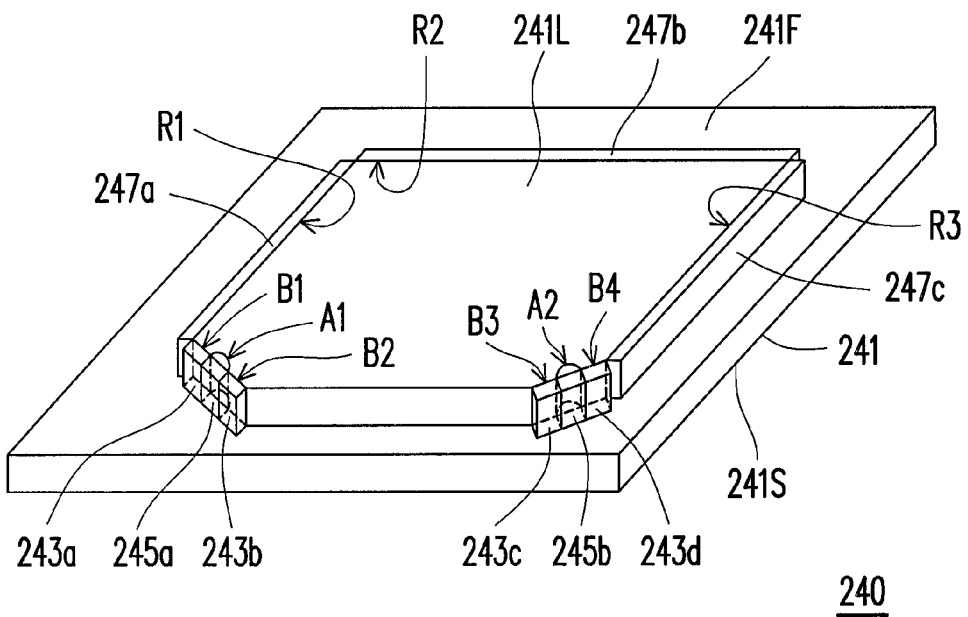
FIG. 3 is a schematic three-dimensional view illustrating an optical touch module according to the first embodiment of the invention.

FIG. 3 is a schematic three-dimensional view illustrating an optical touch module according to the first embodiment of the invention. With reference to FIG. 2 and FIG. 3, in this embodiment, the optical touch module 240 includes a light guide element 241, light sources 243a, 243b, 243c, and 243d, photo sensors 245a and 245b, and reflectors 247a, 247b, and 247c. A sidewall of the light guide portion 241L includes lateral light emitting surfaces A1 and A2, lateral light incident surfaces B1, B2, B3, and B4, and reflective surfaces R1, R2, and R3. The lateral light emitting surfaces A1 and A2 are curved surfaces, and the lateral light incident surfaces B1, B2, B3, and B4 are planes, respectively.

The light source 243a is configured next to the lateral light incident surface B1. The light source 243b is configured next to the lateral light incident surface B2. The photo sensor 245a is configured next to the lateral light emitting surface A1. The light source 243c is configured next to the lateral light incident surface B3. The light source 243d is configured next to the lateral light incident surface B4. The photo sensor 245b is configured next to the lateral light emitting surface A2. Micro-structures can be formed on the lateral light incident surfaces B1, B2, B3, and B4, so as to generate light that is totally reflected at the light guide portion 241L at a certain angle. In addition, optical adhesive can be disposed between the light source 243a and the lateral light incident surface B1, between the light source 243b and the lateral light incident surface B2, between the light source 243c and the lateral light incident surface B3, and between the light source 243d and the lateral light incident surface B4. Since the light sources 243a and 243b and the photo sensor 245a are adjacently disposed, and the light sources 243c and 243d and the photo sensor 245b are adjacently disposed, the thickness of the light guide portion 241L can be reduced.

The reflector 247a is configured on the reflective surface R1. The reflector 247b is configured on the reflective surface R2. The reflector 247c is configured on the reflective surface R3. Thereby, the light supplied by the light sources 243a and 243b is reflected back to the lateral light emitting surface A1, and the light supplied by the light sources 243c and 243d is reflected back to the lateral light emitting surface A2. Even though the optical touch module 240 includes the light sources 243a, 243b, 243c, and 243d and the photo sensors 245a and 245b, and the sidewall of the light guide portion 241L includes the lateral light emitting surfaces A1 and A2 and the lateral light incident surfaces B1, B2, B3, and B4, it should be mentioned that the above is merely exemplary and does not limit the actual configuration of the optical touch module 240. Moreover, since the optical adhesive is disposed between the reflector 247a and the reflective surface R1, between the reflector 247b and the reflective surface R2, and between the reflector 247c and the reflective surface R3, the light can be directly reflected by the reflectors 247a~247c without passing through the air.

Figure 4:
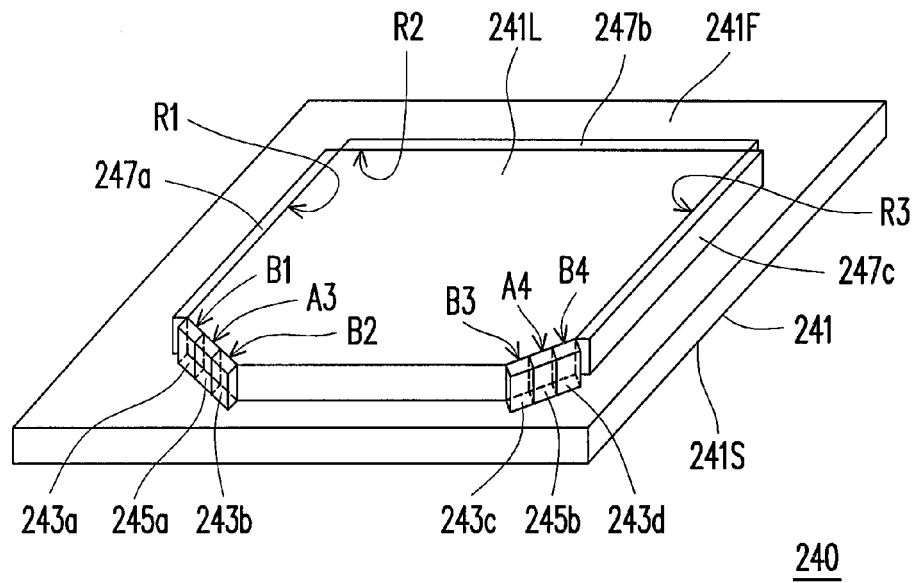
FIG. 4 is another schematic three-dimensional view illustrating the optical touch module according to the first embodiment of the invention.

FIG. 4 is another schematic three-dimensional view illustrating the optical touch module according to the first embodiment of the invention. With reference to FIG. 3 and FIG. 4, the difference therebetween lies in that the lateral light emitting surfaces A3 and A4 of the light guide portion 241L are planes according to this embodiment. Optical adhesive is disposed between the photo sensor 245a and the lateral light emitting surface A3 and between the photo sensor 245b and the lateral light emitting surface A4.

Figure 5:
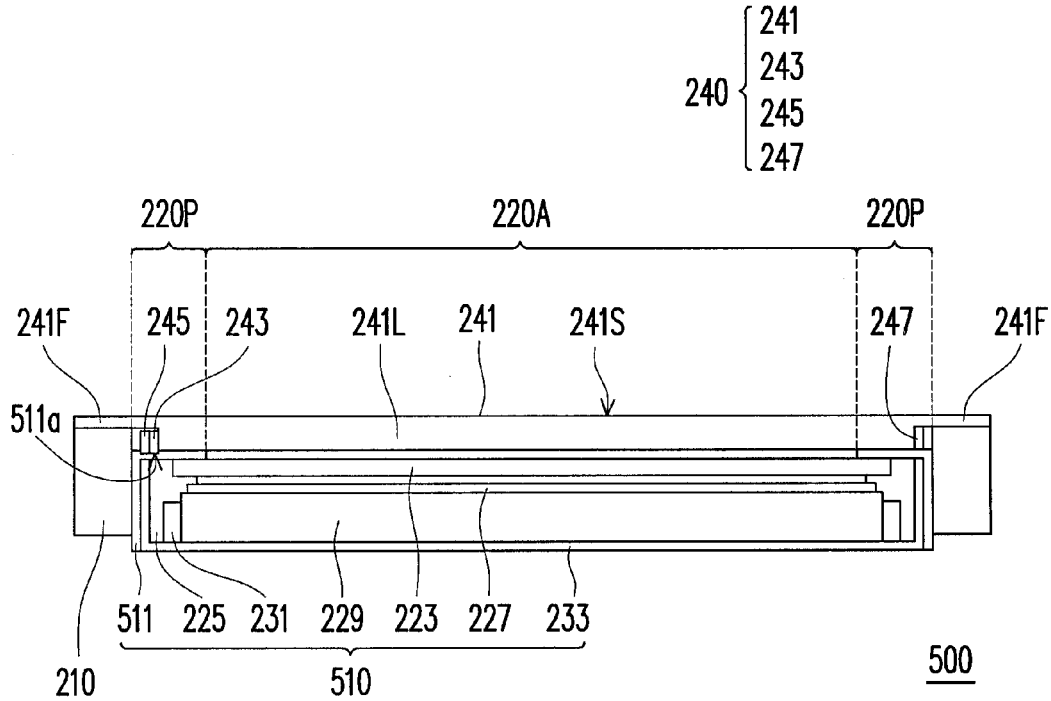
FIG. 5 is a schematic cross-sectional view illustrating a touch display device according to a second embodiment of the invention.

FIG. 5 is a schematic cross-sectional view illustrating a touch display device according to a second embodiment of the invention. With reference to FIG. 2 and FIG. 5, the touch display device 500 is similar to the touch display device 200, while the difference therebetween lies in the front bezel 511 of the LCM 510. The front bezel 511 has a groove 511a that accommodates the light source 243 and the photo sensor 245. Thereby, the light source 243 and the photo sensor 245 can be further secured, and the thickness of the light guide portion 241L can be reduced.

Figure 6:
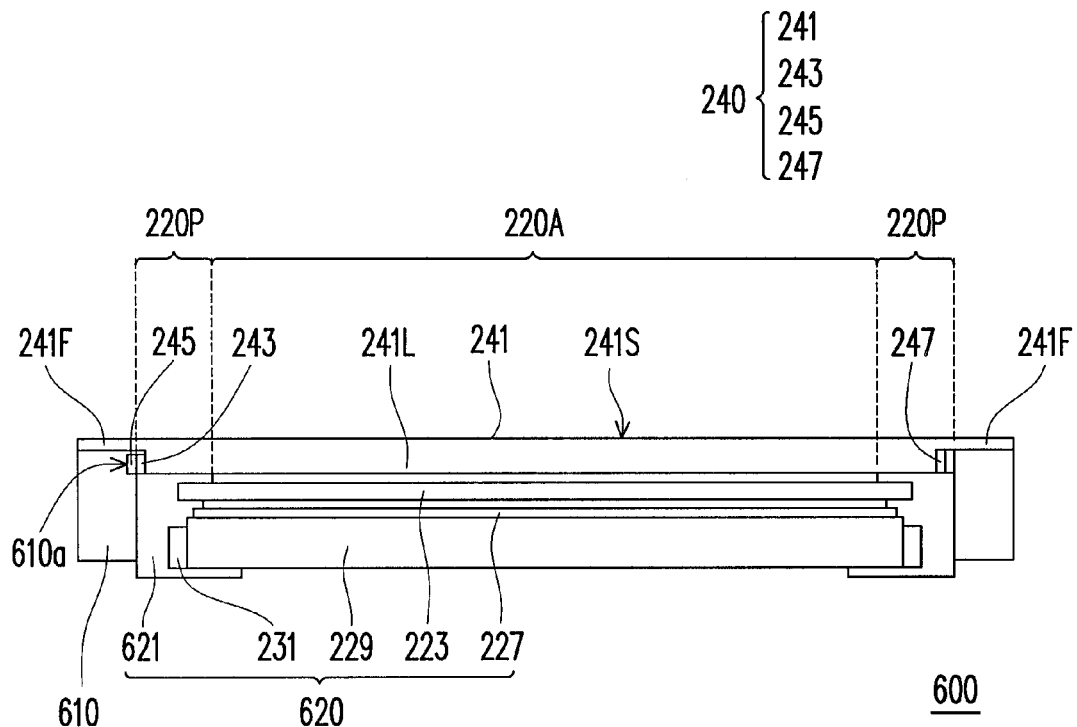
FIG. 6 is a schematic cross-sectional view illustrating a touch display device according to a third embodiment of the invention.

FIG. 6 is a schematic cross-sectional view illustrating a touch display device according to a third embodiment of the invention. With reference to FIG. 2 and FIG. 6, the touch display device 600 is similar to the touch display device 200, while the difference therebetween lies in the device housing 610 and the frame 621 of the LCM 620. The device housing 610 has a groove 610a that accommodates the light source 243 and the photo sensor 245. Thereby, the light source 243 and the photo sensor 245 can be further secured. In this embodiment, the frame 621 replaces the front bezel 211 and the back bezel 233. Hence, the frame 621 holds and accommodates the LCD panel 223, the optical thin film 227, the light guide plate 229, and the backlight source 231. Like the front bezel 511, the frame 621 can also have a groove that accommodates the light source 243 and the photo sensor 245 in other embodiments of the invention. In this case, it is not necessary for the device housing 610 to have the groove 610a.

Besides, in this embodiment, the display region 220A and the peripheral region 220P of the LCM 220 can be defined by the frame 621. Namely, the region of the LCD panel 223 covered by the frame 621 refers to the peripheral region 220P, while the region of the LCD panel 223 not covered by the frame 621 refers to the display region 220A.

Figure 7:
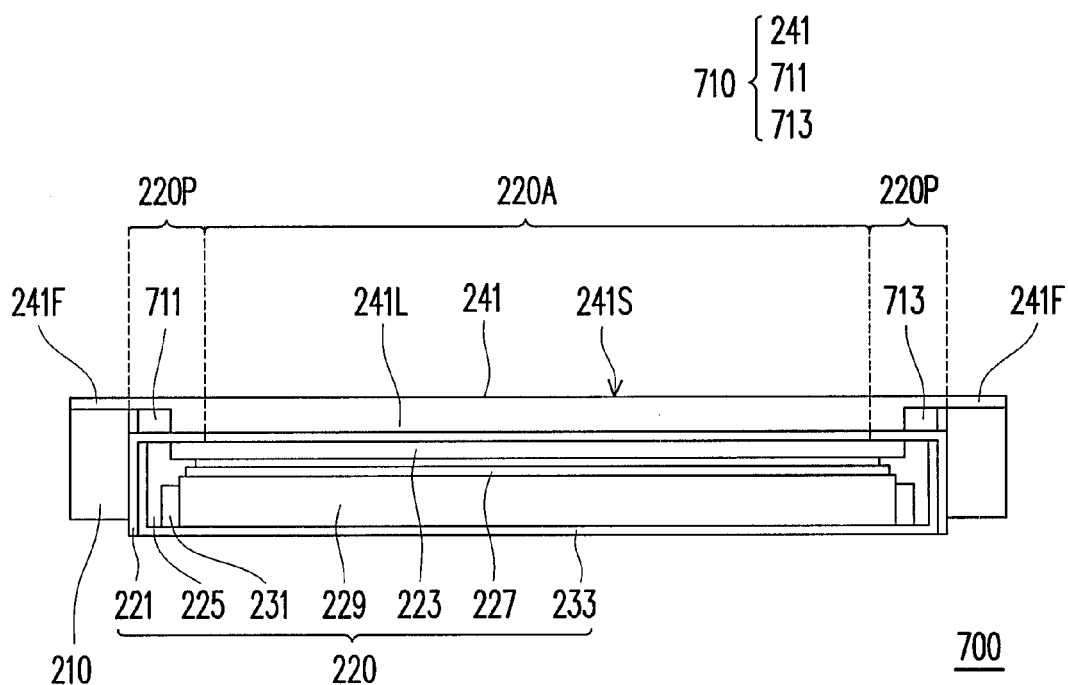
FIG. 7 is a schematic cross-sectional view illustrating a touch display device according to a fourth embodiment of the invention.

FIG. 7 is a schematic cross-sectional view illustrating a touch display device according to a fourth embodiment of the invention. With reference to FIG. 2 and FIG. 7, the touch display device 700 is similar to the touch display device 200, while the difference therebetween lies in the light source 711 and the photo sensor 713 of the optical touch module 710. In this embodiment, the light source 711 and the photo sensor 713 are separately configured on the front bezel 221.

Figure 8:
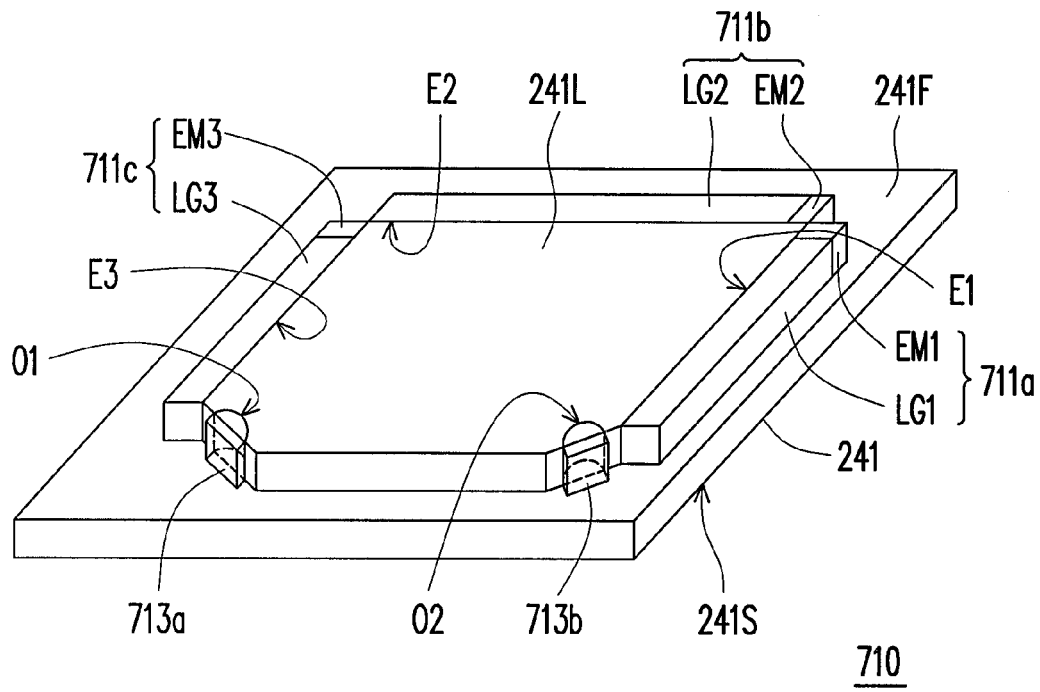
FIG. 8 is a schematic three-dimensional view illustrating an optical touch module according to the fourth embodiment of the invention.

FIG. 8 is a schematic three-dimensional view illustrating an optical touch module according to the fourth embodiment of the invention. With reference to FIG. 7 and FIG. 8, the optical touch module 710 of this embodiment is similar to the optical touch module 240, while the difference therebetween lies in the light sources 711a, 711b, and 711c and the photo sensors 713a and 713b. In this embodiment, the sidewall of the light guide portion 241L includes lateral light emitting surfaces O1 and O2 and lateral light incident surfaces E1, E2, and E3. Here, the lateral light emitting surfaces O1 and O2 are curved surfaces, while the lateral light emitting surfaces can be planes in other embodiments of the invention.

The photo sensor 713a is configured next to the lateral light emitting surface O1. The photo sensor 713b is configured next to the lateral light emitting surface O2. The light source 711a is configured next to the lateral light incident surface E1. The light source 711b is configured next to the lateral light incident surface E2. The light source 711c is configured next to the lateral light incident surface E3. The light source 711a includes a light guide pillar LG1 and a light emitting element EM1. The light supplied by the light emitting element EM1 is transmitted from the lateral light incident surface E1 to the light guide portion 241L through the light guide pillar LG1. The light source 711b includes a light guide pillar LG2 and a light emitting element EM2. The light supplied by the light emitting element EM2 is transmitted from the lateral light incident surface E2 to the light guide portion 241L through the light guide pillar LG2. The light source 711c includes a light guide pillar LG3 and a light emitting element EM3. The light supplied by the light emitting element EM3 is transmitted from the lateral light incident surface E3 to the light guide portion 241L through the light guide pillar LG3. The light passing through the light guide pillars LG1, LG2, and LG3 can be prevented from being transmitted to the outer frame portion 241F by all means. For instance, a non-light-transmissive layer can be formed between the outer frame portion 241F and the light guide pillars LG1, LG2, and LG3.

Figure 9:
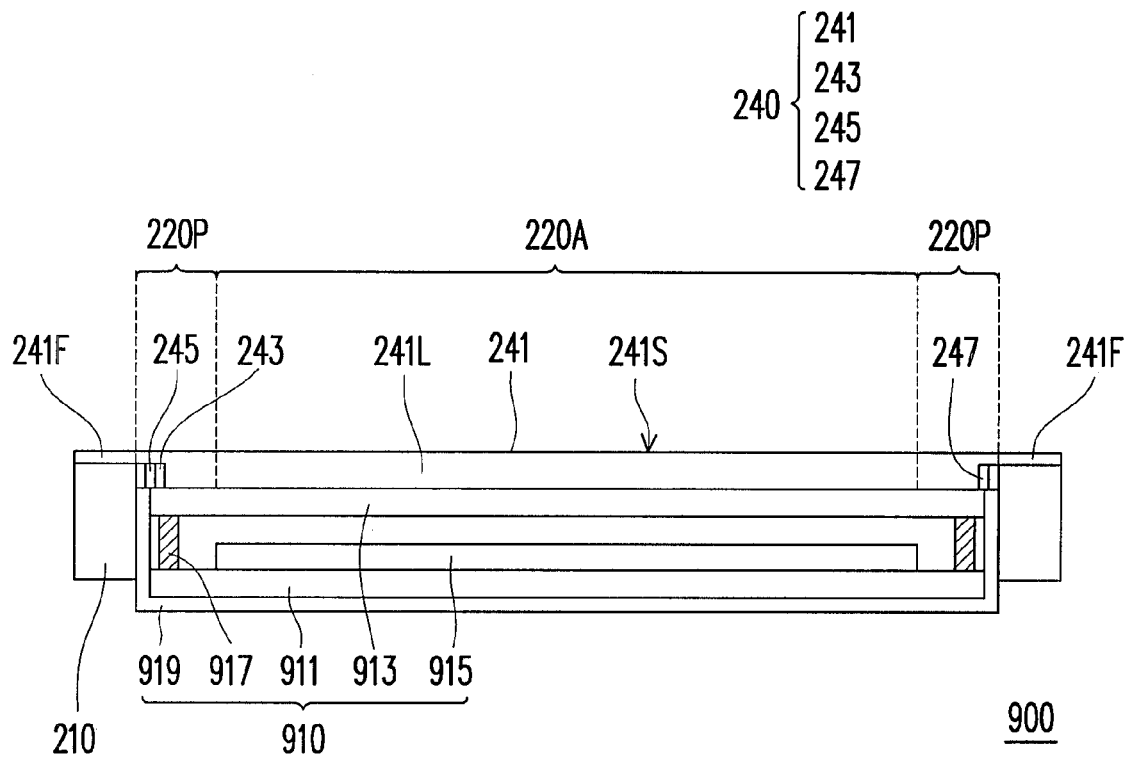
FIG. 9 is a schematic cross-sectional view illustrating an optical touch module according to a fifth embodiment of the invention.

FIG. 9 is a schematic cross-sectional view illustrating a touch display device according to a fifth embodiment of the invention. With reference to FIG. 2 and FIG. 9, the touch display device 900 is similar to the touch display device 200, while the difference therebetween lies in that the display module herein refers to an organic electroluminescence display module 910, for example. The organic electroluminescence display module 910 includes a substrate 911, a transparent cover lid 913, an organic electroluminescence device 915, an adhesive frame 917, and a back bezel 919. The back bezel 919 holds the substrate 911, the transparent cover lid 913, and the adhesive frame 917. The organic electroluminescence device 915 is configured on the substrate 911. The substrate 911 and the transparent cover lid 913 are assembled together through the adhesive frame 917. Besides, the substrate 911, the transparent cover lid 913, the adhesive frame 917, and the back bezel 919 are assembled to form the organic electroluminescence display module 910. Additionally, a frame (e.g., the frame 612 depicted in FIG. 6) can be used to hold the substrate 911, the transparent cover lid 913, and the adhesive frame 917 in other embodiments of the invention.

In light of the foregoing, the light guide element in the touch display device of the invention serves as the cover lid, and the light guide portion of the light guide element transmits the light supplied by the light source of the optical touch module. Thereby, visual effects of the touch display device can be improved, and erroneous operation of the optical touch module can be prevented. Here, the light guide portion and the outer frame portion of the light guide element are integrally formed, so as to strengthen the light guide element.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A touch display device comprising:
   a device housing;
   a display module located within the device housing, the device module having a display region and a peripheral region surrounding the display region;
   an optical touch module configured on the display module, the optical touch module comprising:
      a light guide element having a top surface, the light guide element comprising a light guide portion and an outer frame portion, the light guide portion being located on the display region, the outer frame portion extending from an edge of the light guide portion and being connected to the device housing; wherein a thickness of the light guide portion is greater than a thickness of the outer frame portion, and the outer frame portion extends beyond the peripheral region and extends above the device housing to connect the device housing;
      a light source supplying light to the light guide portion, the outer frame portion covering the light source; and
      a photo sensor receiving the light from the light guide portion, the outer frame portion covering the photo sensor.

2. The touch display device as claimed in claim 1, wherein the display module comprises a liquid crystal display module.

3. The touch display device as claimed in claim 2, the liquid crystal display module comprising:
   a backlight source;
   a frame accommodating the backlight source;
   a liquid crystal display panel configured on the frame and located above the backlight source;
   a back bezel holding the frame and the backlight source; and
   a front bezel assembled to the back bezel, the frame, and the liquid crystal display panel.

4. The touch display device as claimed in claim 3, wherein the light source and the photo sensor are configured on the front bezel.

5. The touch display device as claimed in claim 3, wherein the front bezel has a groove accommodating the light source and the photo sensor.

6. The touch display device as claimed in claim 2, the liquid crystal display module comprising:
   a backlight source;
   a frame; and
   a liquid crystal display panel configured on the frame and located above the backlight source, the frame holding and accommodating the backlight source and the liquid crystal display panel.

7. The touch display device as claimed in claim 6, wherein the light source and the photo sensor are configured on the frame.

8. The touch display device as claimed in claim 6, wherein the frame has a groove accommodating the light source and the photo sensor.

9. The touch display device as claimed in claim 1, wherein the light guide portion and the outer frame portion are integrally formed.

10. The touch display device as claimed in claim 1, wherein a sidewall of the light guide portion comprises a lateral light emitting surface, a lateral light incident surface, and a plurality of reflective surfaces, the light source is configured next to the lateral light incident surface, the photo sensor is configured next to the lateral light emitting surface, and the optical touch module further comprises a plurality of reflectors configured on the reflective surfaces, so as to reflect the light from the light source back to the lateral light emitting surface.

11. The touch display device as claimed in claim 10, wherein the lateral light emitting surface is a plane or a curved surface.

12. The touch display device as claimed in claim 1, wherein a sidewall of the light guide portion comprises a lateral light emitting surface and at least one lateral light incident surface, the photo sensor is configured next to the lateral light emitting surface, the light source is configured next to the at least one lateral light incident surface and includes a light guide pillar and a light emitting element, and light supplied by the light emitting element is transmitted from the at least one lateral light incident surface to the light guide portion through the light guide pillar.

13. The touch display device as claimed in claim 1, wherein the light source, the photo sensor, and the outer frame portion are configured on the peripheral region.

14. The touch display device as claimed in claim 1, wherein the top surface is a flat surface.

15. The touch display device as claimed in claim 1, wherein the light guide portion covers the display region and a portion of the peripheral region.

16. The touch display device as claimed in claim 1, wherein the device housing has a groove accommodating the light source and the photo sensor.

* * * * *